(12) United States Patent
Wu et al.

(10) Patent No.: US 7,884,911 B2
(45) Date of Patent: Feb. 8, 2011

(54) FRINGE FIELD SWITCHING (FFS) SEMI-TRANSMISSIVE LIQUID CRYSTAL DISPLAY

(75) Inventors: Yi-Chun Wu, Hualien County (TW); Chian-Chang Lee, Tainan (TW); Chin-Chang Liu, Taichung (TW)

(73) Assignee: Wintek Corporation (TW)

( * ) Notice: Subject to any disclaimer, the term of this patent is extended or adjusted under 35 U.S.C. 154(b) by 743 days.

(21) Appl. No.: 11/898,822

(22) Filed: Sep. 17, 2007

(65) Prior Publication Data
US 2008/0079882 A1 Apr. 3, 2008

(30) Foreign Application Priority Data
Sep. 29, 2006 (TW) .............................. 95136389 A

(51) Int. Cl.
*G02F 1/1335* (2006.01)
*G02F 1/1343* (2006.01)
(52) U.S. Cl. .................. 349/141; 349/69; 349/113; 349/114; 349/117
(58) Field of Classification Search ............... 349/161, 349/69, 113, 114, 117, 141
See application file for complete search history.

(56) References Cited

U.S. PATENT DOCUMENTS 6,654,087 B2* 11/2003 Song et al. .............. 349/113
6,909,481 B2* 6/2005 Maeda et al. ............ 349/113
7,218,363 B2* 5/2007 Ozawa et al. ............ 349/114
2005/0264720 A1* 12/2005 Itou et al. ................. 349/99
2007/0109455 A1* 5/2007 Kim et al. ................. 349/43

FOREIGN PATENT DOCUMENTS

KR 20040107938 * 1/2004

* cited by examiner

*Primary Examiner*—Julie-Huyen L Ngo
(74) *Attorney, Agent, or Firm*—Bacon & Thomas, PLLC

(57) ABSTRACT

A FFS semi-transmissive LCD comprises a first substrate and pixel matrix. The pixel matrix is disposed on the first substrate and comprises a plurality of pixel units. Each pixel unit comprises a counter electrode, pixel electrode layer, reflection layer and liquid-crystal disposition layer. The counter electrode is disposed on the first substrate. The pixel electrode layer is disposed above the counter electrode. The reflection layer is disposed between the first substrate and pixel electrode layer. The reflection layer is smaller than the counter electrode in area. The liquid-crystal disposition layer is disposed on the pixel electrode layer and comprises a transparent material layer. The transparent material layer is smaller than the liquid-crystal disposition layer in thickness and has substantially the same shape and area as the reflection layer, and the transparent material layer and the reflection layer are face-to-face disposed at two opposite sides of the pixel electrode layer.

16 Claims, 10 Drawing Sheets

US 7,884,911 B2

FRINGE FIELD SWITCHING (FFS) SEMI-TRANSMISSIVE LIQUID CRYSTAL DISPLAY

This application claims the benefit of Taiwan application Serial No. 95136389, filed Sep. 29, 2006, the subject matter of which is incorporated herein by reference.

BACKGROUND OF THE INVENTION

1. Field of the Invention

The invention relates in general to a liquid crystal display (LCD), and more particularly to a fringe field switching (FFS)-type semi-transmissive LCD.

2. Description of the Related Art

In order to improve the drawback of a conventional TN-type LCD with a narrow view-angle, manufacturers provide several kinds of wide view-angle LCDs, such as an in-plane-switching (IPS) wide view-angle LCD, a multi-domain vertical alignment (MVA) LCD and a FFS-type LCD. The FFS-type LCD has a wide view-angle effect and high transmission rate, and can operate without a compensation film in terms of advantages.

However, the conventional wide view-angle LCD is normally transmissive-type or reflective-type. The transmissive-type LCD can only display images by using a backlight source and under sunshine or intense environmental light source, the user cannot clearly observe the displayed images due to interference of the external light source. The reflective-type LCD can only be used under intense environmental light source, and apart from the intense environmental light source, the user cannot observe clear images on it, which causes great difficulty in usage of a portable LCD. Therefore, how to have the wide view-angle feature and simultaneously provide the user with clear display images under any environmental situation is indeed an essential target of the LCD research and development.

SUMMARY OF THE INVENTION

The invention is directed to a LCD. The liquid-crystal disposition layer of each pixel is divided into a first liquid crystal layer and a second liquid crystal layer and it is designed that the light path difference of the environmental light passing through the first liquid crystal layer is equal to that of the backlight passing through the second liquid crystal layer. Therefore, the purpose of having both a wide view-angle feature and semi-transmissive effect can be achieved.

According to the present invention, a FFS semi-transmissive LCD is provided. The LCD comprises a first substrate and pixel matrix. The pixel matrix is disposed on the first substrate and comprises a plurality of pixel units. Each of the pixel units comprises a counter electrode, pixel electrode layer, reflection layer and liquid-crystal disposition layer. The counter electrode is disposed above the first substrate. The pixel electrode layer is disposed above the counter electrode. The reflection layer is disposed between the first substrate and the pixel electrode layer, wherein the reflection layer is smaller than the counter electrode in area. The liquid-crystal disposition layer is disposed on the pixel electrode layer, and the liquid-crystal disposition layer comprises a transparent material layer. The transparent material layer is smaller than the liquid-crystal disposition layer in thickness, the transparent material layer has substantially the same shape and area as the reflection layer, and the transparent material layer and the reflection layer are face-to-face disposed at two opposite sides of the pixel electrode layer.

The invention will become apparent from the following detailed description of the preferred but non-limiting embodiments. The following description is made with reference to the accompanying drawings.

DETAILED DESCRIPTION OF THE INVENTION

Figure 1:
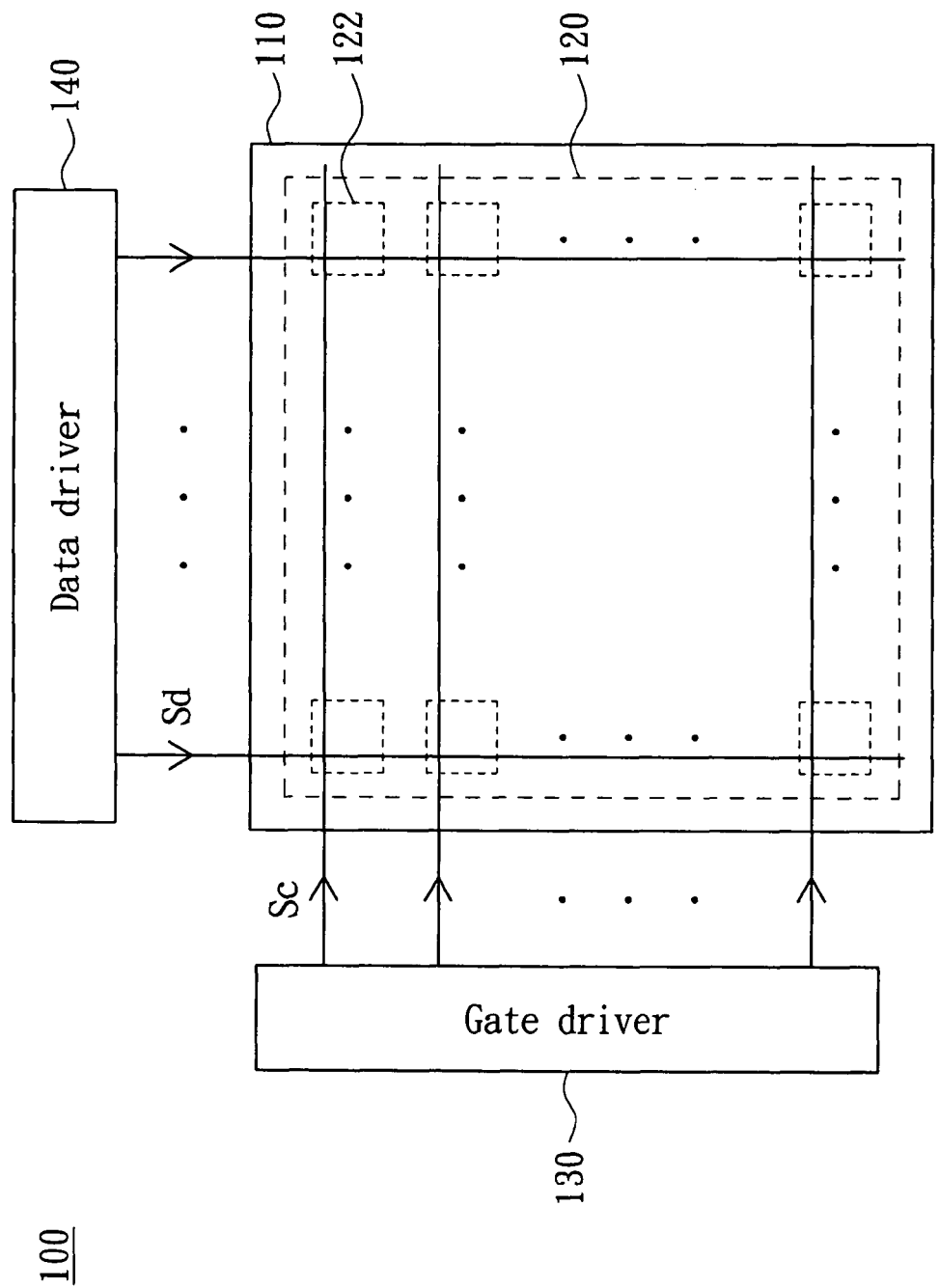
FIG. 1 is a block diagram of a FFS-type LCD according to a preferred embodiment of the invention.

Referring to FIG. 1, a block diagram of a FFS-type LCD according to a preferred embodiment of the invention is shown. A FFS-type LCD 100 is, for example, applied to a portable electronic device, and includes a lower substrate 110, pixel matrix 120, gate driver 130 and data driver 140. The pixel matrix 120 is disposed on the lower substrate 110 and the pixel matrix 120 includes several rows of pixel units 122. The gate driver 130 sequentially outputs a gate signal Sc to the pixel matrix 120 to enable a thin film transistor (TFT) of each row of pixel units 122 to receive a data signal (voltage) Sd outputted by the data driver 140.

Figure 2:
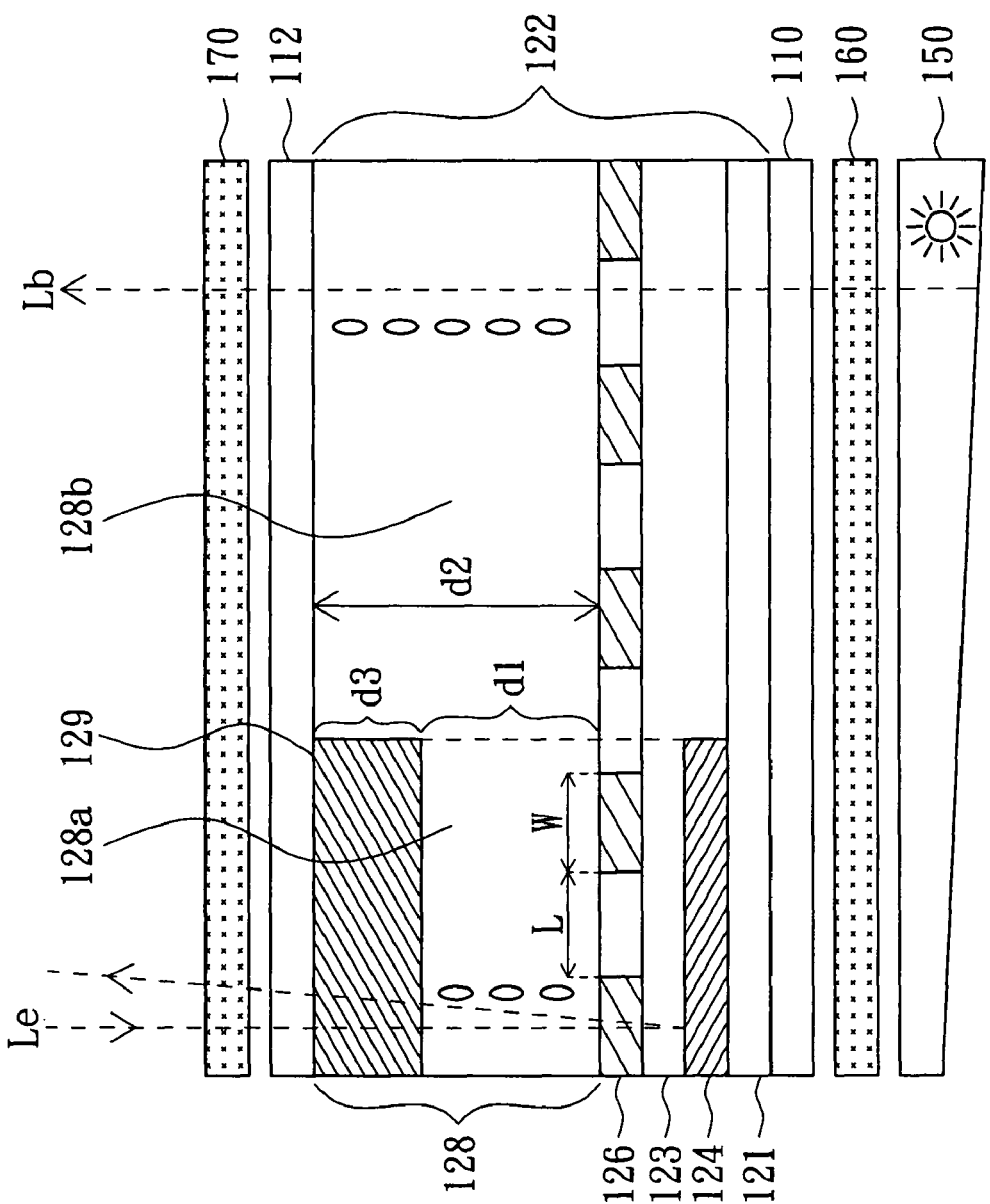
FIG. 2 is a cross-sectional diagram of a pixel unit 122 of the LCD 100 in FIG. 1.

Referring to FIG. 2, a cross-sectional diagram of a pixel unit 122 of the LCD 100 in FIG. 1 is shown. Each pixel unit 122 is disposed between the upper substrate 112 and the lower substrate 110. A backlight module 150 is disposed under the lower substrate 110 for providing backlight to each pixel unit 122 for displaying images. A first polarization plate 160 and a second polarization plate 170 are respectively disposed under the lower substrate 110 and above the upper substrate 112, and absorption axes of the first polarization plate 160 and the second polarization plate 170 can be vertical or in parallel.

Besides, the pixel unit 122 further includes a counter electrode 121, an insulation layer 123, a reflection layer 124, a pixel electrode layer 126 and a liquid-crystal disposition layer 128. The pixel electrode layer 126 is, for example, a transparent comb-shape electrode disposed on the lower substrate 110, and the counter electrode 121 is disposed between the lower substrate 110 and pixel electrode layer 126. The insulation layer 123 is, for example, made of silicone nitride (SiNx) or silicone dioxide ($SiO_2$) and disposed between the counter electrode 121 and the pixel electrode layer 126 for electrically isolating the two layers 121 and 126. The reflection layer 124 is, for example, a metal material and disposed between the insulation layer 123 and the counter electrode 121. The reflection layer 124 is smaller than the counter electrode 121 in area. Preferably, the area ratio of the reflection layer 124 to the counter electrode 121 is 0.1~0.9, which includes 0.1 and 0.9. The liquid-crystal disposition layer 128 is disposed between the pixel electrode layer 126 and upper substrate 112. The liquid-crystal disposition layer 128 includes a transparent material layer 129, such as an organic material and disposed on the upper substrate 112. The thickness (d3) of the transparent material layer 129 is smaller than the thickness (d2) of the liquid-crystal disposition layer 128. The transparent material layer 129 and the reflection layer 124 have substantially the same shape and area and are face-to-face disposed at two opposite sides of the pixel electrode layer 126.

The feature of the LCD 100 of the embodiment lies on the liquid-crystal disposition layer 128 of the pixel unit 122 is divided into a first liquid crystal layer 128a and a second liquid crystal layer 128b by using the transparent material layer 129 and reflection layer 124 as shown in FIG. 2. In the liquid-crystal disposition layer 128, the first liquid crystal layer 128a located between the transparent material layer 129 and the pixel electrode layer 126 is a liquid crystal reflective region and the second liquid crystal layer 128b located outside the region between the transparent material layer 129 and pixel electrode layer 126 is a liquid crystal transmissive region. The first liquid crystal layer 128b is connected to the second liquid crystal layer 128a, and the first liquid crystal layer 128a and the second liquid crystal layer 128b of the liquid-crystal disposition layer 128 respectively have thickness d1 and d2, wherein d1=d2−d3.

When the gate driver 130 outputs a gate signal Sc to enable each pixel unit 122 for inputting data signals Sd to the pixel electrode layer 126, the backlight Lb transmitting vertically into the liquid-crystal disposition layer 128 has a phase difference changing between 0 and (½)λ according to voltage driving of the pixel electrode layer 126. The environmental light Le transmitting vertically into the transparent material layer 129 has a phase difference changing between 0 and (¼)λ according to voltage driving of the pixel electrode layer 126. That is, the phase difference ($\Delta n1*d1$) of the environmental light Le as transmitting vertically through the first liquid crystal layer 128a to reach the pixel electrode layer 126 is one half of the phase difference ($\Delta n2*d2$) of the backlight Lb as transmitting vertically through the second liquid crystal layer 128b. Therefore, the transmission rate (V-T) curve can have the optimum effect and the semi-transmissive function of the LCD 100 can be achieved. The parameters $\Delta n1$ and $\Delta n2$ are liquid-crystal birefringence indexes of the first liquid crystal layer 128a and the second liquid crystal layer 128b, respectively.

Figure 3:
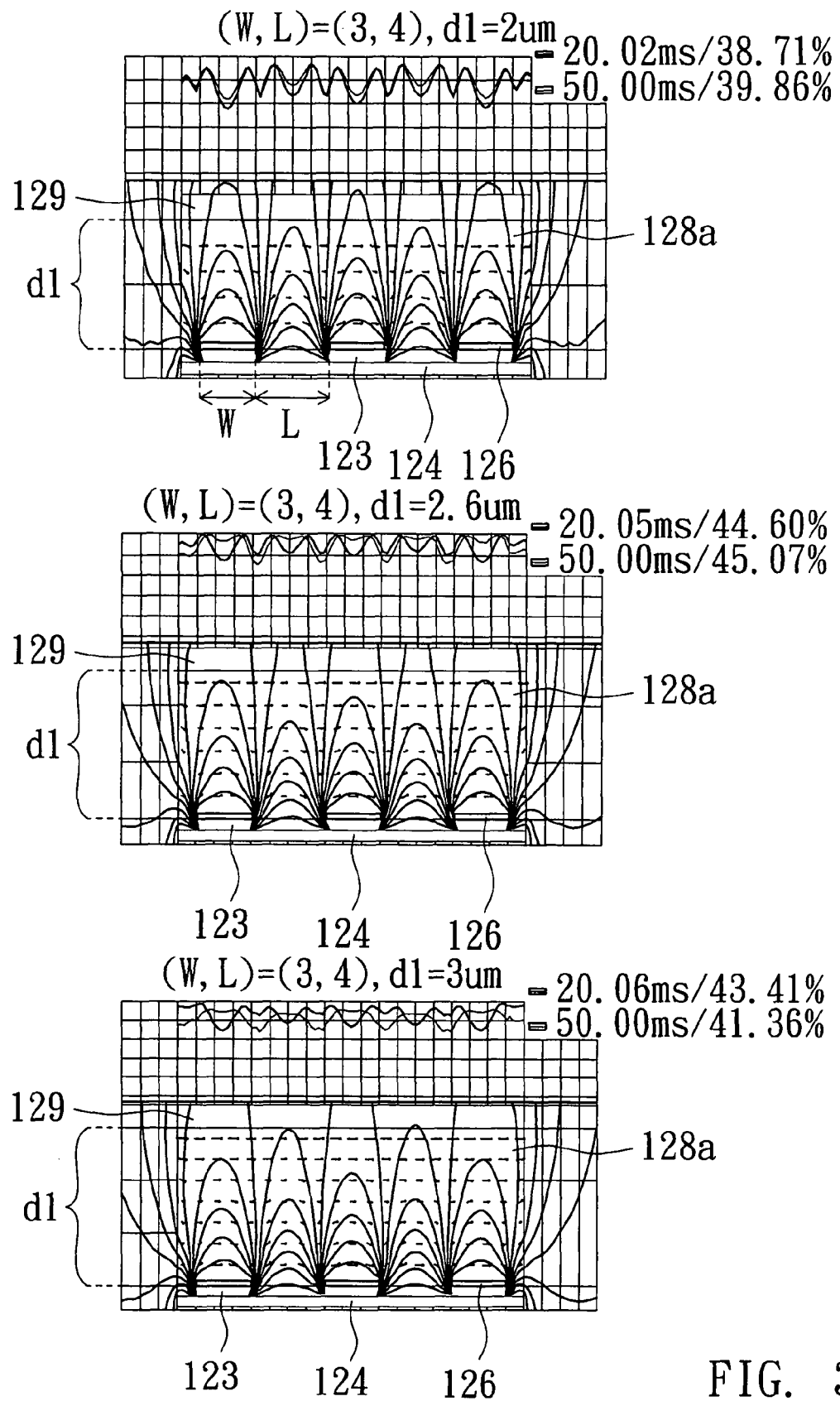
FIG. 3 is a schematic simulation diagram of transmission rates of a pixel unit with a constant comb-shape electrode width and electrode interval and various thickness of the first liquid crystal layer.

The above first liquid crystal layer 128a and second liquid crystal layer 128b of the liquid crystal disposition layer 128 have a thickness ratio (d1/d2) equal to ¼~⅔ preferably. Owing that the FFS-type LCD drives liquid crystals by a fringe field, the wide (W) and electrode interval (L) of the comb-shape electrode affects an image-display effect. According to a simulation calculation, under a fixed thickness (d2) 4 um of the second liquid crystal layer 128b, by using the thickness ratio (d1/d2) of the first liquid crystal layer 128a and the second liquid crystal layer 128b of the liquid-crystal disposition layer 128 equal to a value between ½ and ¾ and different values (W, L), the following different transmission rates of the first liquid crystal layer 128a can be obtained:

(1) (W, L)=(3 um, 4 um), the thickness d1 of the first liquid crystal layer 128a is respectively 2 um, 2.6 um and 3 um, and the transmission rate of the first liquid crystal layer 128a is as shown in FIG. 3. Corresponding to the thickness d1 2 um, 2.6 um and 2.3 um of the first liquid crystal layer 128a, the average transmission rates of the first liquid crystal layer 128a in 20 ms are respectively 38.71%, 44.60% and 43.41% and the average transmission rates of the first liquid crystal layer 128a in 50 ms are respectively 39.86%, 45.07% and 41.36%.

Figure 4:
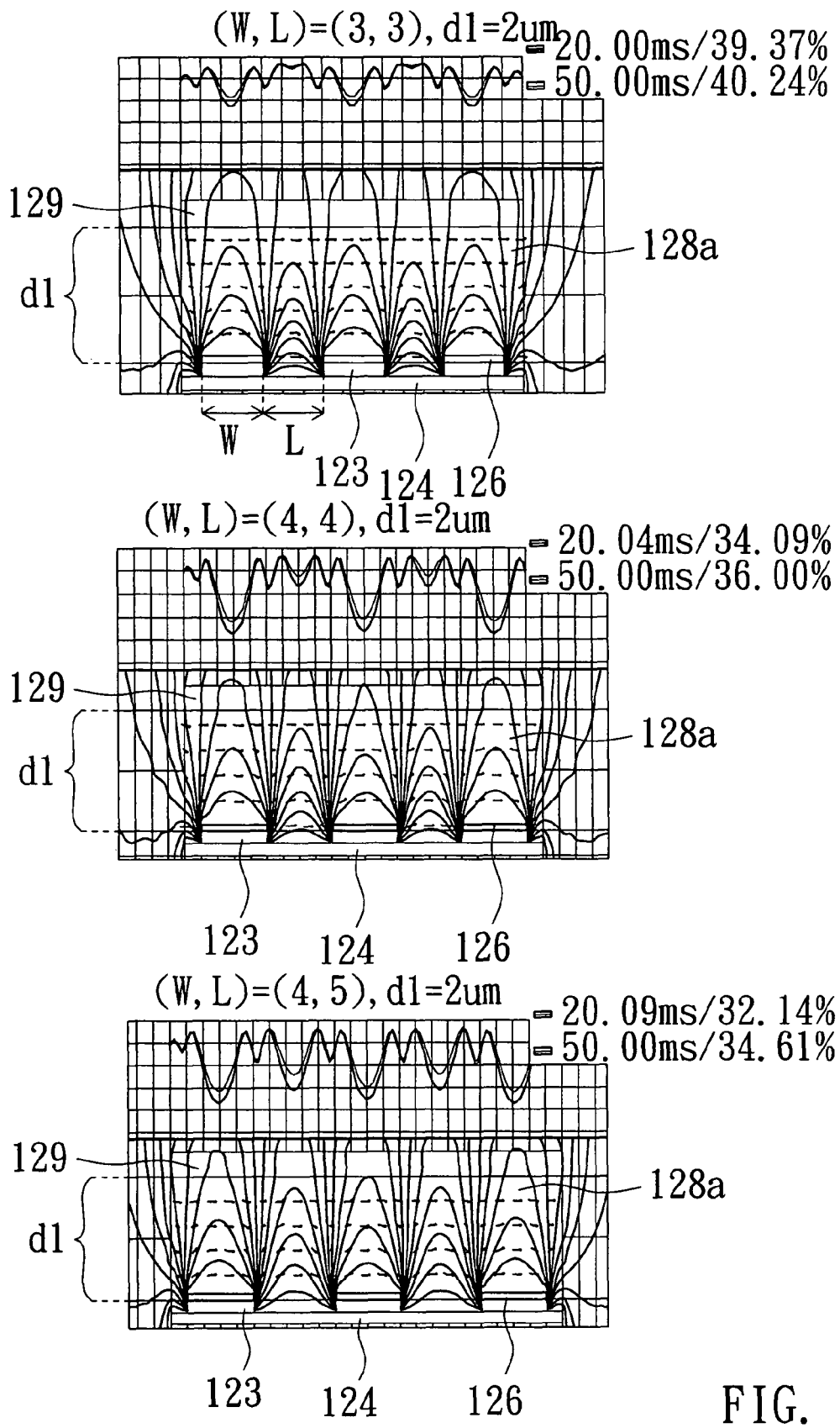
FIG. 4 is a schematic simulation diagram of transmission rates of a pixel unit with a constant thickness of the first liquid crystal layer and various comb-shape electrode widths and electrode intervals.

(2) The thickness d1 of the first liquid crystal layer 128a is fixed to 2 um, the values (W, L) are respectively (3 um, 3 um), (4 um, 4 um) and (4 um, 5 um) and the transmission rate of the first liquid crystal layer 128a is as shown in FIG. 4. Corresponding to the values (W, L) (3 um, 3 um), (4 um, 4 um) and (4 um, 5 um), the average transmission rates of the first liquid crystal layer 128a in 20 ms are respectively 39.37%, 34.09% and 32.14% and the average transmission rates of the first liquid crystal layer 128a in 50 ms are respectively 40.24%, 36.00% and 34.61%.

Figure 5:
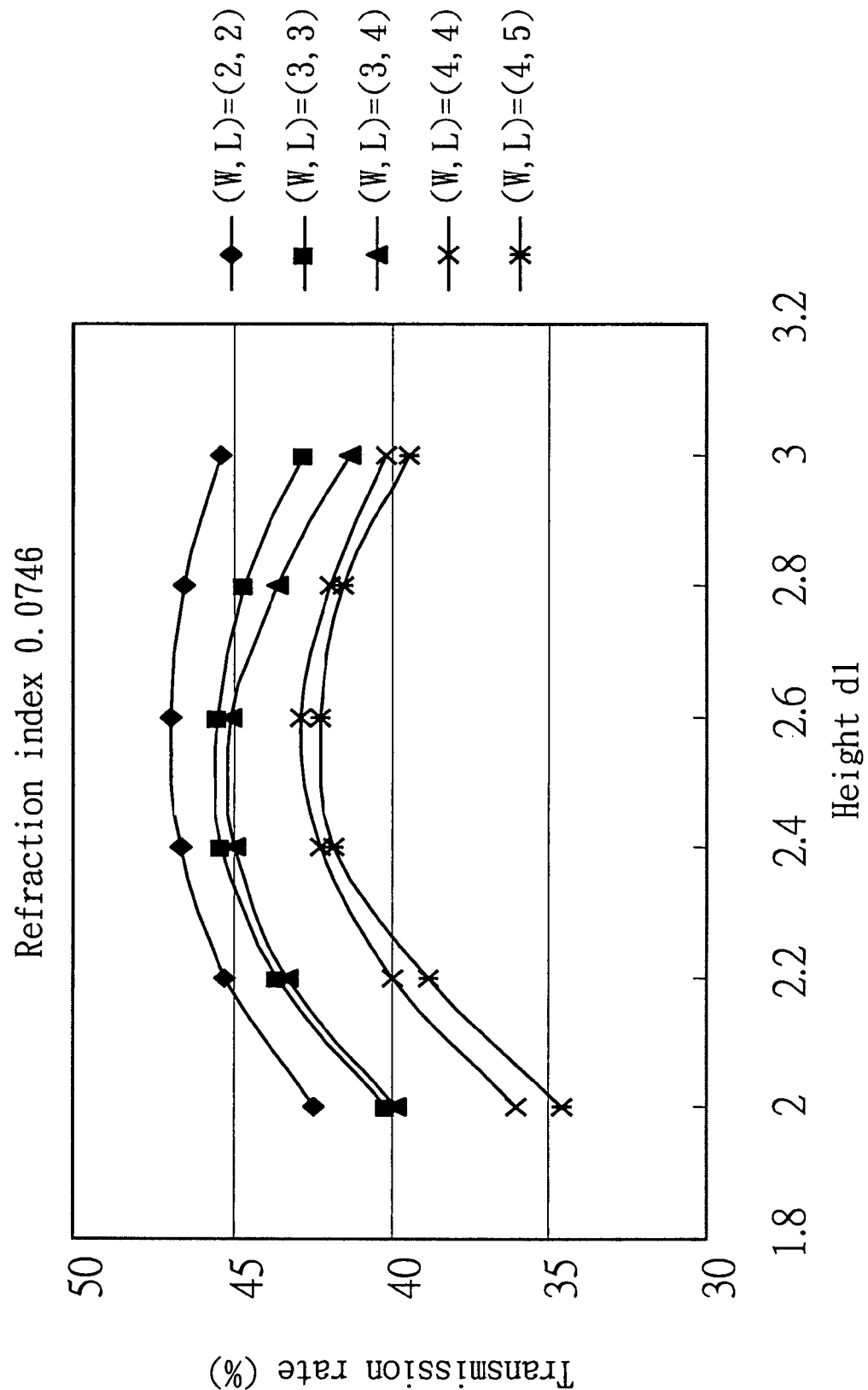
FIG. 5 is a schematic simulation diagram of the highest transmission rate of a pixel unit with a specific thickness of the first liquid crystal layer and a specific comb-shape electrode width and interval.
Figure 7:
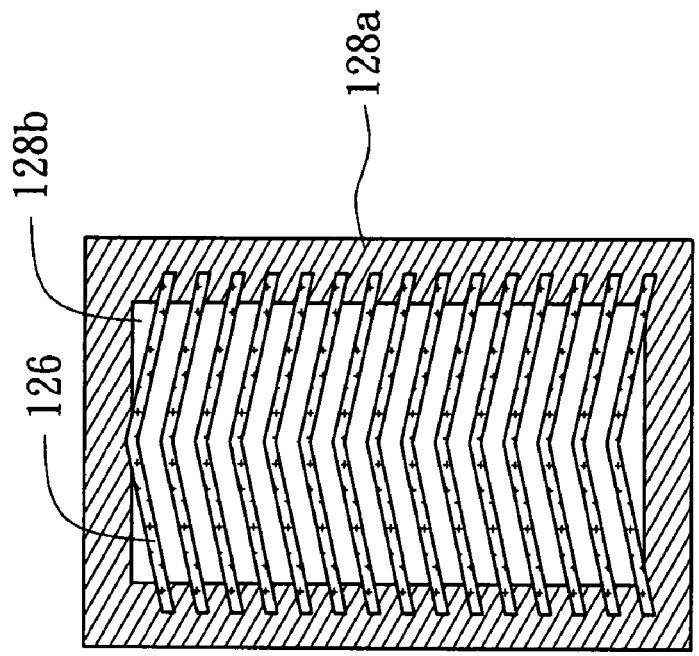
FIG. 7 is a schematic diagram of a pixel electrode layer with saw-toothed electrode plates arranged at a constant interval.

As shown in FIG. 5, under different values (W, L)=(2,2), (3,3), (3,4), (4,4) and (4,5), the average transmission rate and thickness d1 of the first liquid crystal layer 128a have five relationship curves. From the five relationship curves, when the thickness d1 of the first liquid crystal layer 128a is about 2.5 um~2.6 um, the first liquid crystal layer 128a can have the highest transmission rate under the values (W, L)=(2,2), (3,3), (3,4), (4,4) and (4,5).

Therefore, by adjusting the values (W, L) of the pixel electrode layer (comb-shape electrode) 126 and the thickness ratio (d1/d2) of the first liquid crystal layer 128a and second liquid crystal layer 128b of the liquid-crystal disposition layer 128, the transmission-rate curve of the reflective region 128a and the transmissive region 128b can have the optimum effect and thus the LCD 100 can have the semi-transmissive function.

Figure 6:
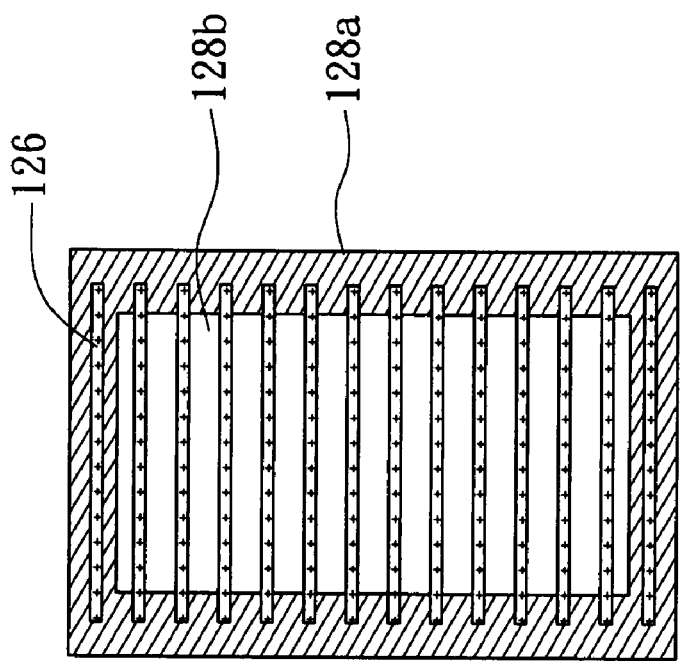
FIG. 6 is a schematic diagram of a pixel electrode layer with electrode plates arranged in parallel and a transparent material layer disposed at a marginal area of the liquid-crystal disposition layer.
Figure 10:
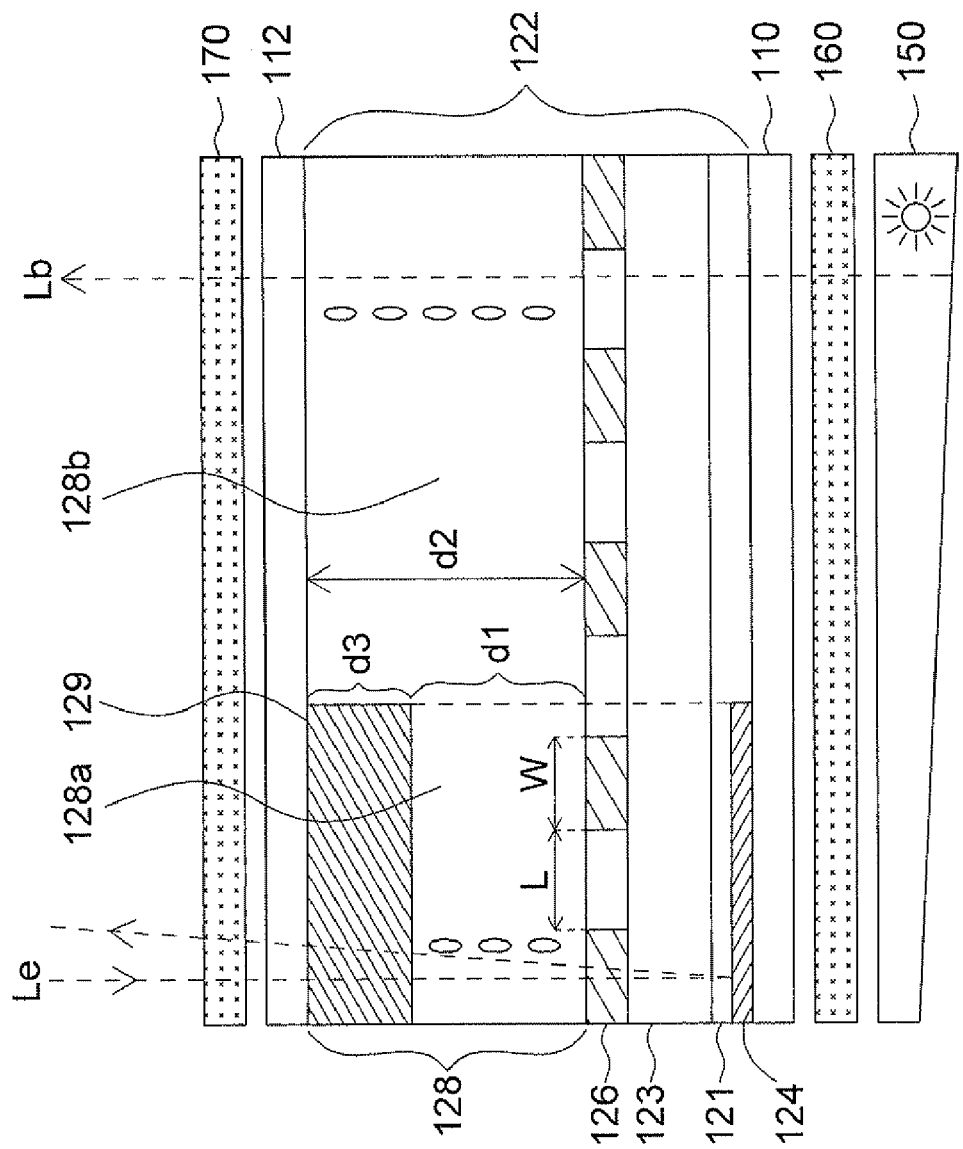
FIG. 10 is a block diagram of a FFS-type LCD according to another embodiment of the invention.
Figure 11:
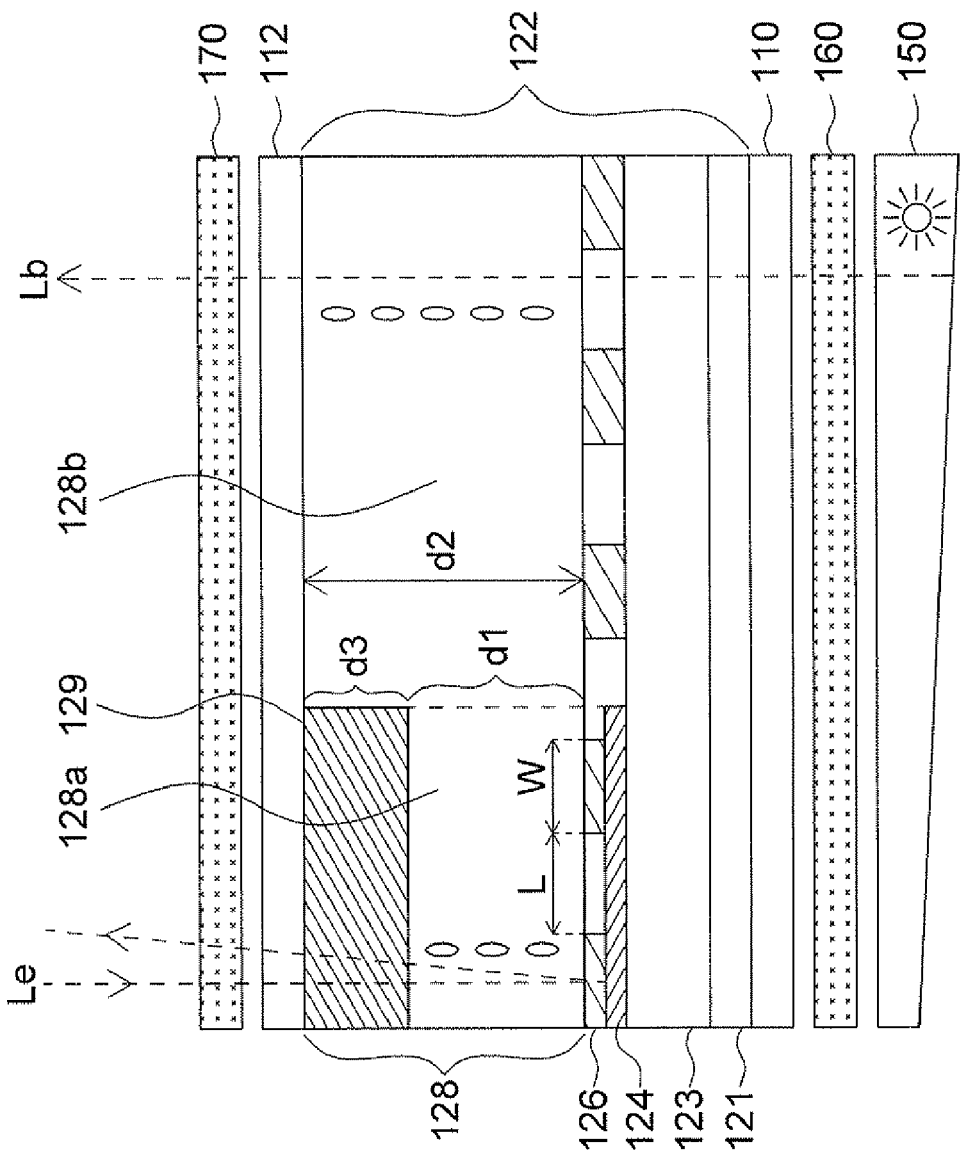
FIG. 11 is a block diagram of a FFS-type LCD according to one another embodiment of the invention.

Besides, the above reflection layer 124 can also be disposed between the lower substrate 110 and the counter electrode 121 (shown in FIG. 10) or between the counter electrode 121 and the insulation layer 123, or an insulated reflection layer 124 is used to dispose between the insulation layer 123 and the pixel electrode layer 126 (shown in FIG. 11). The pixel electrode layer 126 can also be a comb-shape electrode with a number of rod-like electrode plates arranged in parallel as shown in FIG. 6 or a comb-shape electrode with a number of saw-toothed electrode plates arranged at a constant interval. The electric field generated by the saw-toothed electrode plates can drive the liquid crystals to have different rotating directions as so to reduce a color-shift issue due to view-angle variation.

Figure 8:
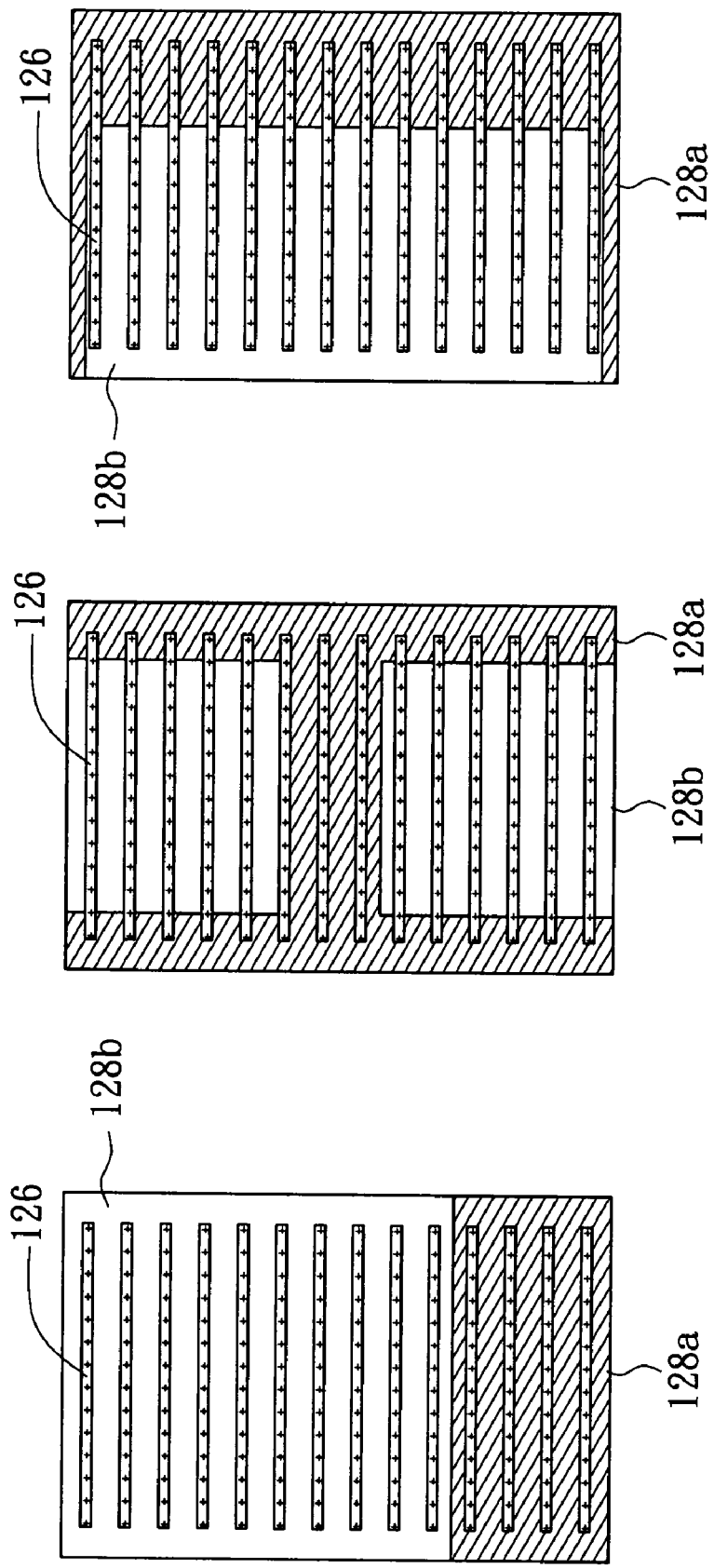
FIG. 8 is a schematic diagram of other disposition situations of the transparent material layer relative to the liquid-crystal disposition layer.

Moreover, the transparent material layer 129 of each pixel unit 122 can be disposed to surround at a marginal area of the liquid-crystal disposition layer 128 as shown in FIG. 6. Or the transparent material layer 129 can also be disposed at a side area of the liquid-crystal disposition layer 128 or disposed in the liquid-crystal disposition layer 128 in any other way as shown in FIG. 8. The transparent material layer 129 can also be disposed without connecting to the upper substrate 112. As long as the transparent material layer 129 and the reflection layer 124 are disposed to divide the liquid-crystal disposition layer 128 into the first liquid crystal layer 128a and the second liquid crystal layer 128b connected together to achieve the semi-transmissive effect, any alternative will not depart from the scope of the invention.

Figure 9:
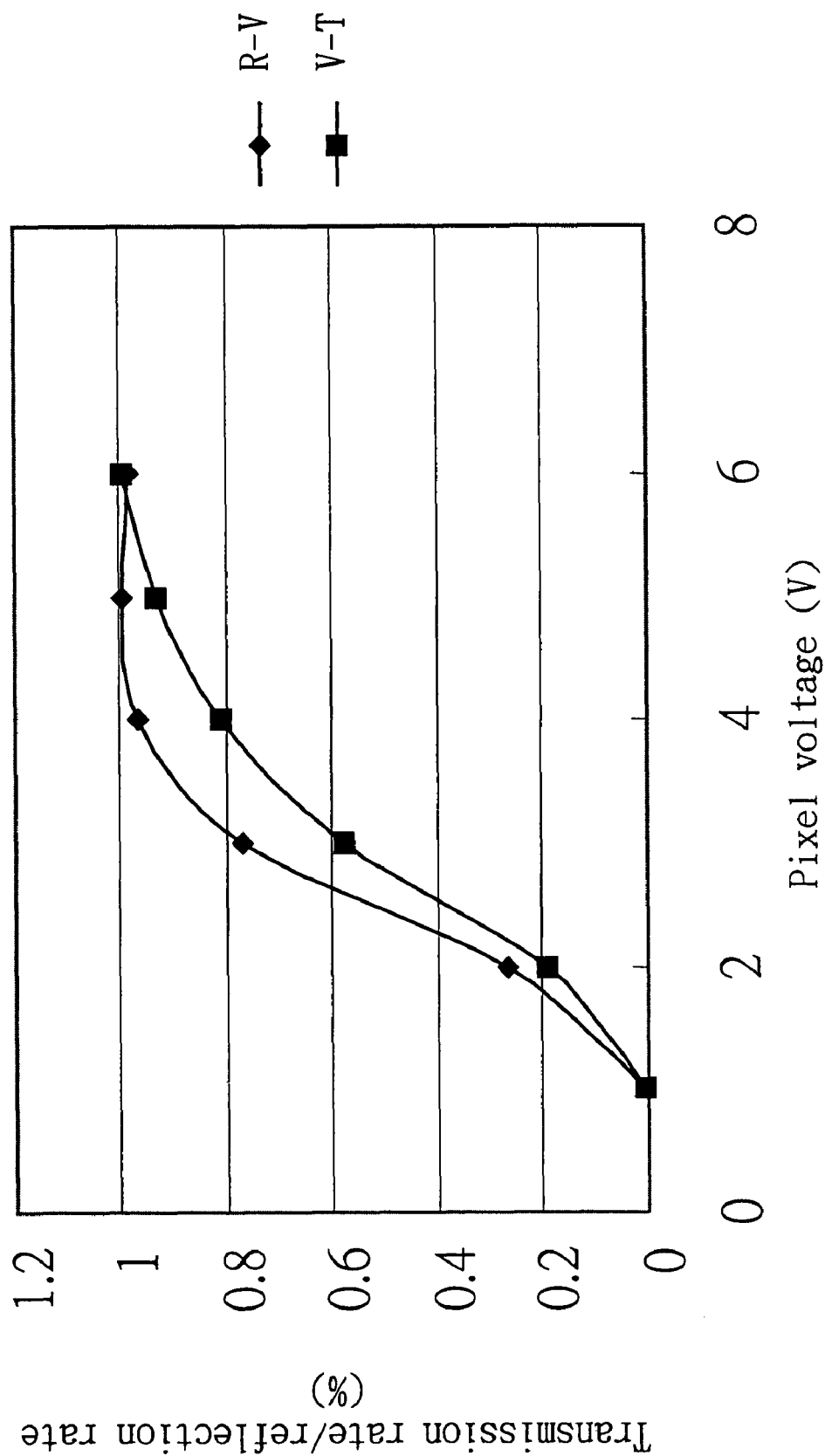
FIG. 9 is simulation diagram of an R-V curve and V-T curve of pixel driving according to a preferred embodiment of the invention.

The LCD disclosed by the above embodiment of the invention can prevent the drawback of the conventional portable wide view-angle LCD which is not applicable under intense environmental light. The transparent material layer and the reflection layer are used in the FFS-type LCD for controlling phase difference of the first liquid crystal layer and second liquid crystal layer in the liquid-crystal disposition layer of each pixel such that the phase difference of the transmissive region is varied between (½)λ and 0 and the phase difference of the reflective region is varied between (¼)λ and 0 due to voltage driving. Therefore, the V-T curve of the transmissive region and the R-V curve of the reflective region can have the optimum effect as shown in FIG. 9 in which no reversed image effect occurs and thus the LCD can have the semi-transmissive function. The LCD of the invention is very suitable for displaying images outdoors and has the features of wide view-angle, high transmission rate, which can be applied to products such as high-resolution 3G mobile phones and small-scale film (TV) players.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fringe field switching (FFS) semi-transmissive liquid crystal display (LCD), comprising:
 a first substrate; and
 a pixel matrix, disposed on the first substrate, the pixel matrix comprising a plurality of pixel units, each of the pixel units comprising:
 a counter electrode, disposed above the first substrate;
 a pixel electrode layer, disposed above the counter electrode;
 a reflection layer, disposed between the first substrate and the pixel electrode layer, wherein the reflection layer is smaller than the counter electrode in area; and
 a liquid-crystal disposition layer, disposed on the pixel electrode layer, the liquid-crystal disposition layer comprising a transparent material layer;
 wherein the transparent material layer is smaller than the liquid-crystal disposition layer in thickness, the transparent material layer has substantially the same shape and area as the reflection layer, the transparent material layer and the reflection layer are face-to-face disposed at two opposite sides of the pixel electrode layer, and in each of the pixel units, the transparent material layer surrounds at a marginal area of the liquid-crystal disposition layer.

2. The LCD according to claim 1, wherein the area ratio of the reflection layer to the counter electrode is 0.1~0.9.

3. The LCD according to claim 1, wherein the reflection layer is disposed between the first substrate and the counter electrode.

4. The LCD according to claim 1, wherein each of the pixel units further comprises an insulation layer disposed between the counter electrode and the pixel electrode layer, and the reflection layer is disposed between the insulation layer and the counter electrode.

5. The LCD according to claim 1, wherein each of the pixel units further comprises an insulation layer disposed between the counter electrode and the pixel electrode layer, and the reflection layer is insulated and disposed between the insulation layer and the pixel electrode layer.

6. The LCD according to claim 4 or 5, wherein the insulation layer is made of silicone nitride (SiNx) or silicone dioxide (SiO2).

7. The LCD according to claim 1, wherein the reflection layer is made of metal.

8. The LCD according to claim 1, wherein the pixel electrode layer is a transparent comb-shaped electrode with a plurality of rod-like electrode plates arranged in parallel.

9. The LCD according to claim 1, wherein the pixel electrode layer is a transparent comb-shaped electrode with a plurality of saw-toothed electrode plates arranged at a constant interval.

10. The LCD according to claim 1, further comprising a second substrate, formed on the liquid-crystal disposition layers of the pixel units, wherein the transparent material layer of each of the pixel units is disposed on the second substrate.

11. The LCD according to claim 10, further comprising a backlight module disposed under the first substrate for providing a backlight to the pixel matrix, wherein each of the liquid-crystal disposition layer comprises a first liquid crystal layer located between the transparent material layer and the pixel electrode layer and a second liquid crystal layer connected to the first liquid crystal layer and the transparent material layer, environmental light as transmitting vertically into the transparent material layer to reach the pixel electrode layer via the first liquid crystal layer has a phase difference equal to one half of the phase difference of the backlight as vertically transmitting through the second liquid crystal layer.

12. The LCD according to claim 11, wherein the first liquid crystal layer and the second liquid crystal layer have a thickness ratio ¼~⅔.

13. The LCD according to claim 11, wherein the backlight vertically transmitting the liquid crystal disposition layer has a phase difference changing between 0 and (½)λ according to voltage driving of the pixel electrode layer, wherein λ is wavelength of the backlight.

14. The LCD according to claim 1, further comprising a first polarization plate and a second polarization plate, wherein the first polarization plate is disposed under the first substrate, the second polarization plate is disposed above the second substrate, and absorption axes of the first polarization plate and the second polarization plate are perpendicular.

15. The LCD according to claim 1, further comprising a first polarization plate and a second polarization plate, wherein the first polarization plate is disposed under the first substrate, the second polarization plate is disposed above the second substrate, and absorption axes of the first polarization plate and the second polarization plate are in parallel.

16. The LCD according to claim 1, is applied to a portable electronic apparatus.

* * * * *